Dec. 30, 1930.  W. L. McDONALD  1,787,319
POWER STEERING MECHANISM
Filed Aug. 16, 1928  3 Sheets-Sheet 2
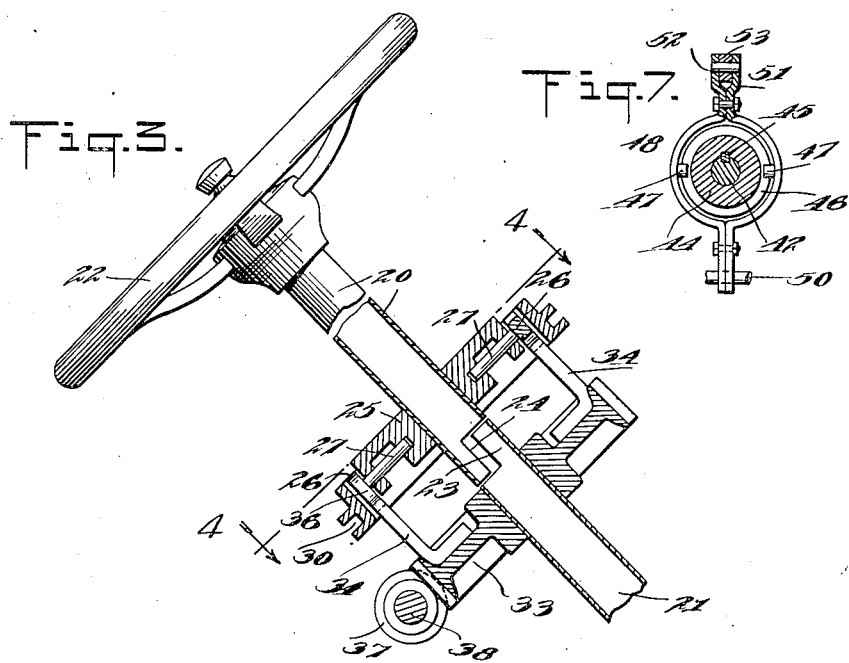
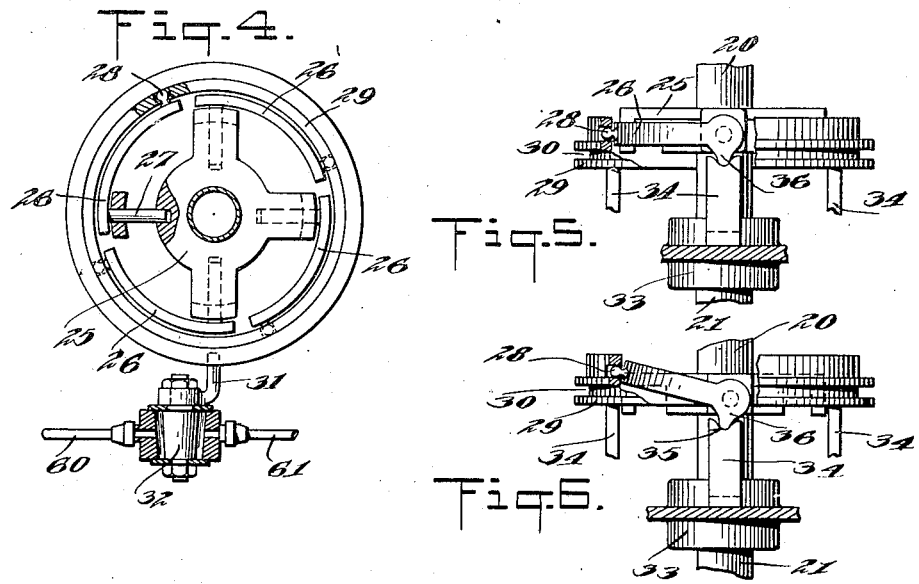
WITNESSES
J. Andersson
INVENTOR
W. L. McDonald
BY
Munn & Co.
ATTORNEY Dec. 30, 1930.  W. L. McDONALD  1,787,319
POWER STEERING MECHANISM
Filed Aug. 16, 1928  3 Sheets-Sheet 3
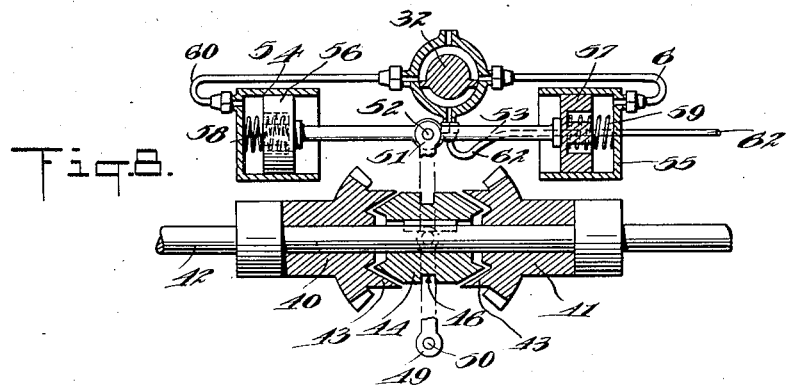
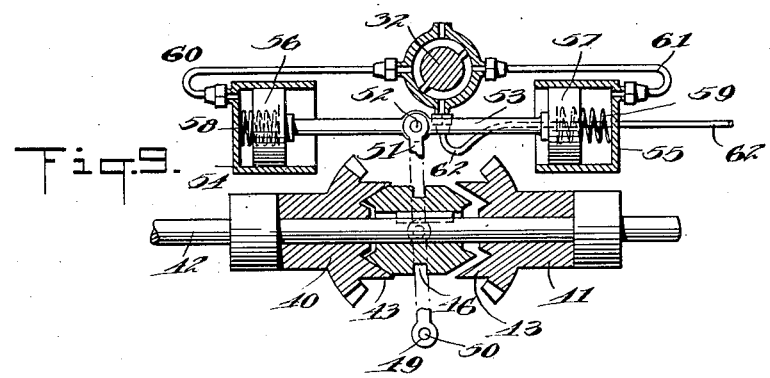
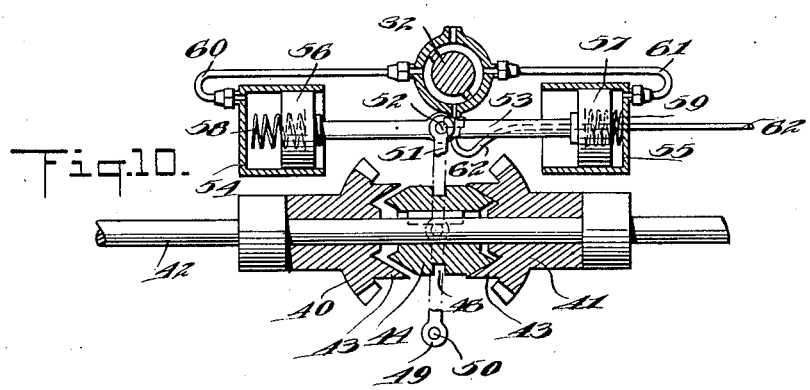
WITNESSES
J. Anderson
INVENTOR
W. L. McDonald
BY
Munn & Co
ATTORNEY Patented Dec. 30, 1930

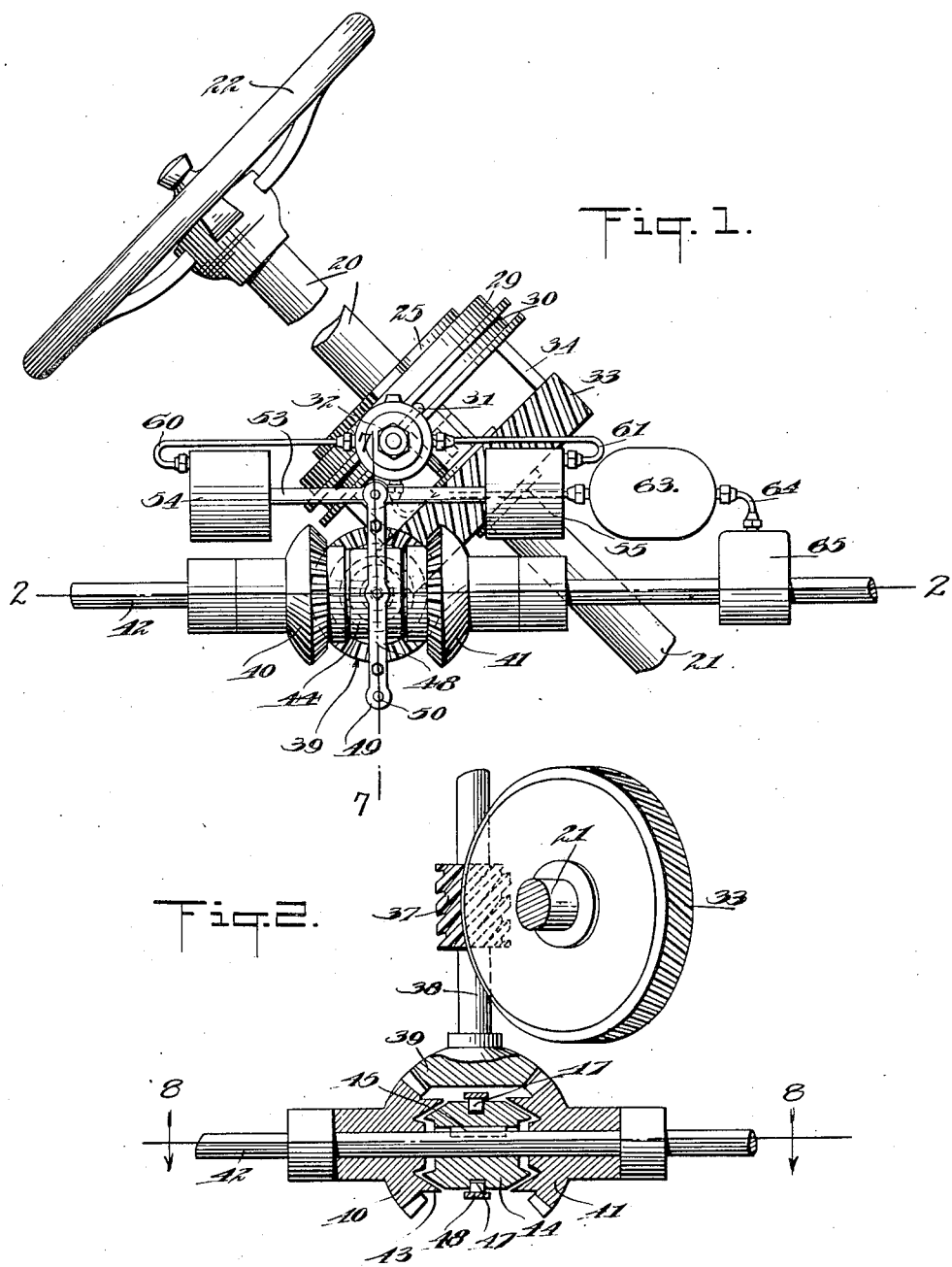

1,787,319

UNITED STATES PATENT OFFICE

WILLIAM L. McDONALD, OF PENSACOLA, FLORIDA

POWER STEERING MECHANISM

Application filed August 16, 1928. Serial No. 300,062.

This invention appertains to improvements in power steering mechanisms generally, and more particularly to a type of such mechanisms which is adapted for application to power driven vehicles of all classes and descriptions, especially large and powerful passenger cars, busses, automobiles, and other automotive vehicles.

In the operation of power driven land and water vehicles of the heavier and larger types, such as large and powerful passenger cars, busses and trucks, motor boats and the like, the steering of the same is ordinarily accomplished by means of a manually operated member or wheel controlled directly by the driver or operator. In the instance of the operation of automotive vehicles generally, wherein the steering of the same is accomplished by turning the front wheels thereof, when a vehicle is passing over a hard smooth highway and is travelling in a substantially straight course, the action of the steering wheel aforesaid does not ordinarily require the exertion of any considerable amount of physical force on the part of the driver or operator, but in making turns or sudden swerves, especially at slow speeds, as in congested traffic, the operation of such control devices makes for the exertion of much greater force, even on comparatively smooth roadways, which tends to greatly fatigue the driver or operator after an appreciable amount of continuous driving, particularly in the operation of the larger and heavier vehicles aforesaid. The driving of motor vehicles over rough, rutty or soft roadways is extremely arduous and tiring, since a greater amount of effort is required to operate the steering gear correctly, and it frequently happens that when a vehicle is being operated at a fairly high rate of speed, the operator is unable to properly control the movements of the vehicle with the result that a more or less serious accident occurs. Also, in operating a motor vehicle over rutted roads, it is very often desirable to steer the vehicle clear of a rut, and this is ofttimes practically impossible of acomplishment even by the average driver or operator of a motor vehicle, since the force required in such a case is considerable, and the necessary steering operation should be accomplished almost instantly to bring the steering wheels into angular relation to the forward path of travel of the automobile to cause the same to mount the side of the rut rather than to be turned to such angular position slowly and intermittently as is often the case in the manual operation of the steering mechanism.

An object of the invention, therefore, is to provide a steering mechanism of the class set forth, which is embodied in a comparatively simple and inexpensive construction and arrangement of parts, such as will effectively and efficiently utilize power derived from the prime mover of a vehicle on which it is installed to readily and quickly change the course or direction of travel of the vehicle at the will of the operator.

Another object of the invention is to provide a mechanism as hereinbefore characterized, which includes the usual manually operated steering control of a vehicle, and permits the same to be utilized in the ordinary manner of its operation to cause an application of power from the prime mover of the vehicle to the steering mechanism proper of the vehicle in a manner to actuate the latter in the necessary direction to accomplish a contemplated and predetermined directional movement of the vehicle.

With the foregoing and other equally important objects and advantages in view, the invention resides in the certain new and useful combination, construction and arrangement of parts and mechanisms as will be hereinafter more fully described, set forth in the appended claims, and illustrated in the accompanying drawings, in which:

Figure 1 is a side elevation of the general assembly of the power control mechanism as it appears in practical cooperative relation to and with a conventional form of manually operated steering means of a motor vehicle, Figure 2 is a fragmentary horizontal section taken substantially on the line 2—2 of Figure 1, Figure 3 is a vertical section through an intermediate portion of the steering post and certain of the parts of the power transmitting mechanism immediately cooperative therewith, Figure 4 is a sectional view taken on the line 4—4 of Figure 3, and showing the upper side of the power control mechanism mounted on the steering post in plan and partly in section, Figure 5 is a side elevation, partly in section, of that portion of the mechanism shown in Figure 4, and showing the same in one position of operation, Figure 6 is a view similar to Figure 5, but showing the mechanism in another position of operation, Figure 7 is a vertical section taken on the line 7—7 of Figure 1, Figure 8 is a horizontal section through the reversible driving gears, the clutch device cooperative therewith, and the pneumatically operated control mechanism therefor, and showing the parts thereof in neutral position, the same being taken substantially on the line 8—8 of Figure 2, Figure 9 is a view similar to that in Figure 8, but showing the parts in an operative position, and Figure 10 is a further view similar to Figure 8, but showing the parts in an operative position reversed from that operative position of the same as in Figure 9.

Referring to the drawings, wherein like characters of reference designate corresponding parts throughout the several views thereof, the embodiment of the invention, as shown therein by way of example, comprises a steering post formed to provide aligned upper and lower parts or sections 20 and 21 respectively, the upper end of the upper part or section 20 having a usual form of hand wheel 22 mounted thereon, and the lower end of the lower part or section 21 the usual connections (not shown) to the steering wheels of the vehicle. The adjacent ends of the upper and lower sections 20 and 21 are formed with cutaway portions 23, which are disposed in overlapping relation, but with a clearance, as at 24 (Figure 3), between the same to admit of a limited amount of free rotative movement to the parts or sections 20 and 21.

Rigidly mounted on the lower end portion of the upper part or section 20, of the steering post, is a spider 25 which carries several curved lever arms 26 having inwardly directed pins 27 at one end engaged in the ends of the radially disposed arms of the spider 25, and outwardly directed pins 28 at their opposite ends which support on the same an annular member or ring 29. Extending circumferentially of the outer periphery of this member or ring 29 is a groove 30 into which is projected the free end of the operating lever 31 of an air control valve 32.

Secured on the upper end portion of the lower steering post part or section 21 is a worm gear 33 on the upper side of which are several arms 34 complementally disposed with respect to the lever arms 26 aforesaid, and each of these arms 34 is provided with a groove 35 in its upper end disposed in mesh with a tooth 36 carried at the lower side of a lever arm 26. With this arrangement of the parts, it will be evident that, if the upper steering post part or section 20 is turned, through the space 24 between the overlapping portions 23 of the same and the lower part or section 21, say from the position of the parts as in Figure 5, the lever arms 26 and with them the annular member or ring 29 will be raised to the positions as shown in Figure 6, in one direction or partial rotation of the hand wheel 22, or these parts will be depressed to the positions as shown in Figure 5 from the positions thereof in Figure 6, in a reversed direction of partial rotation of the hand wheel 22, and it is this reversed motion of the annular member or ring 29 which operates the air valve 32 to opened and closed positions through the medium of the lever or arm 31 of the latter being engaged in the groove 30 of the member or ring 29 for the purpose.

The worm gear 33, on the lower steering post part or section 21 is arranged in mesh with a worm 37 keyed on a shaft 38 which has similarly keyed on one of its ends a bevelled gear 39 disposed in mesh with a pair of bevelled gears 40 and 41. The gears 40 and 41 are loosely mounted on a shaft 42, which is supported at right angles to the shaft 38, and is driven from the prime mover of the vehicle. In the case of the vehicle being propelled by an internal combustion engine, this shaft 42 may be an extension of the cam, pump or generator shafts (not shown) of the engine, or it may be a special shaft driven from the engine in any suitable or desired manner. By thus mounting the gears 40 and 41 loosely on the driven shaft 42 and the fixed gear 39 on the shaft 38, in lieu of the alternative arrangement of the gears 40 and 41 loosely on shaft 39 and the gear 39 rigidly on the shaft 42, the gears 39, 40 and 41, in the first instance, are stationary when there is no movement of the steering column 20, 21, whereas, in the second instance, these several gears would continuously rotate with the driven shaft 42, whenever the engine (not shown) is running.

The opposed faces of these loosely mounted bevelled gears 40 and 41 are each formed to provide substantially cup-shaped projections 43 having cone shaped centers. Between the gears 40 and 41 is positioned a double cone clutch member 44, which is keyed, as at 45 to the driven shaft 42, but otherwise loosely mounted thereon for longitudinal movement in opposite directions for the frictional engagement of its oppositely cone shaped ends with one or the other of the conical centers of the cupped projections 43 on the gears 40 and 41.

Around the center of the clutch member 44 is formed a groove 46 into which is projected a pair of oppositely disposed pins 47 mounted at the inner side of a yoke 48. Projecting from the under side of the yoke 48 is an extended portion 49 which is pivoted, as at 50, to a fixed part of the vehicle, and projecting similarly from the upper side of the yoke 48 is a second extension 51 having a pivot connection, as at 52, to a longitudinally movable rod 53 extending parallel to and above the driven shaft 42.

The opposite ends of the rod 53 are projected centrally inward of a pair of opposed cylinders 54 and 55, and engage in pistons 56 and 57 operable in the latter, the pistons being normally held by coiled springs 58 and 59 equidistantly spaced from the outer end walls or heads of the cylinders with the result that the pivot connection 52 of the rod 53 with the upper extension 51 of the clutch yoke 48 is centered between the cylinders, and the movable clutch member 44 is maintained in neutral position with respect to the clutch faces 43 of the loosely mounted gears 40 and 41, in which position of the parts, the driven shaft 42 and the movable clutch member 44 run idly.

The outer ends of the cylinders 54 and 55, are connected by conduits or pipes 60 and 61, to the opposite sides of the air control valve 32. A compressed air supply pipe 62 leads from the valve between the points of connection therewith of the conduits or pipes 60 and 61 and connects a reservoir 63, which is to be supplied with air under pressure through a conduit or pipe 64 from a suitable pump 65 to be operated preferably from the driven shaft 42. A port in the valve casing opposite to the point of connection with the casing of the air supply pipe 62 is normally open to atmosphere, so that pressure is relieved at the outer ends of the pistons 56 and 57, and the springs 58 and 59 are free to equalize their tension on the latter and position the rod 53, the clutch yoke 48 pivoted thereto, and the movable clutch member 44 in normal or neutral position as aforesaid.

In the operation of the mechanism, as thus constructed and arranged, when it is desired to cause a directional movement to the vehicle on which the mechanism is installed, the hand wheel 22 is turned in proper direction for the purpose as usual. In the initial or free turning movement of the wheel 22 and the upper post section 20, the lever arms 26 are caused to be raised or lowered by the action of the teeth 36 being rocked in proper direction in the grooves or notches 35 in the upstanding arms 34 carried on the upper side of the worm 33. These lever arms 26, in turn, raise or lower the annular member or ring 29, so that the groove 30, engaged by the operating lever or arm 31, operates the latter in a manner to admit compressed air from the reservoir 63 to one or the other of the cylinders 54 and 55 through the conduits or pipes 60 and 61.

By reference to Figures 8, 9 and 10, it will be readily observed that, with the parts in normal or neutral position, as in Figure 8, the driven shaft 42 and the movable clutch member 44 will idle during the rotation of the shaft 42, but that, when compressed air is admitted in a manner as aforesaid to one of the cylinders 54 and 55, as for instance to the right hand cylinder 55 as shown in Figure 9, the piston 57 and the rod 53 are pushed to the left, so that the yoke 48, through its pivot connection 52 with the rod 53, is swung to the left on its lower pivot 50 and the movable clutch 44 has its left hand end forced into engagement with the complemental clutch face 43 of the left hand gear 40, when power from the driven shaft 42 will be transmitted through the movable clutch member 44 to the gear 40 and from thence to the steering wheels of the vehicle through the fixed gear 39, the shaft 38, the meshing worm gears 37 and 33 and the lower steering column section 21. The parts thus driven from the shaft 42 continue to operate until the lower post section 21 becomes neutral with respect to the upper post section 20 and the latter is again turned from the hand wheel 22. It will be evident that a motion of the hand wheel 22 and the upper post section 20 in the opposite direction will reverse the parts of the mechanism to the positions thereof, as shown in Figure 10, and until the two post sections 20 and 21 are again neutral.

It will be noted that, if for any reason the apparatus should fail to work, the steering post is still operative by hand just as though the power mechanism were not present.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. In steering mechanism for motor vehicles and the like, a driven shaft, spaced gear wheels on the shaft and having opposed clutch faces, a slidable clutch member on the shaft between the gear wheels and having a groove in its periphery, means for operating the steering mechanism from the gear wheels, opposed cylinders, pistons in the cylinders, springs between the pistons and cylinder heads, a rod connecting the pistons, a pivoted yoke engaging the groove of the slidable clutch member and pivoted to the rod at the center of its length, an air pressure reservoir connected with the cylinders, and a valve for controlling the admission of air to the said cylinders.

2. In steering mechanism for motor vehicles and the like, a sectional steering post having limited movement between its sections, the upper section being provided with a steering wheel and the lower section adapted for connection with the steering mechanism of the vehicle by means of a gear wheel mounted on the lower section, a driven shaft, gearing for operating the lower section of the steering post from the shaft, pneumatically operated means for controlling the movement of said shaft, a valve controlling the pneumatic means and having an operating lever, a slidable member carried by the upper section of the steering post and operatively connected with the operating lever of the valve, and cooperating means carried by the slidable member on the upper steering post section and the gear wheel on the lower steering post section for raising and lowering the slidable member.

3. In steering mechanism for motor vehicles and the like, a sectional steering post having limited movement between the sections, the upper section having the usual steering wheel and the lower section adapted for connection with the steering mechanism of the vehicle, a shaft driven from the motor, gearing for operating the lower section of the steering post from the shaft, one of the gears being on the lower section of the steering post, pneumatically operated means for controlling the movement of the shaft, a valve controlling the pneumatic means and having an operating lever, a spider on the upper section of the steering post, a ring slidably mounted on the spider and having a peripheral groove with which the operating lever of the valve engages, members carried by the spider and engaging the slidable member, and members on the gear wheel on the steering post section and operably engaging the members on the spiders.

WILLIAM L. McDONALD.